United States Patent
Maripudi (10) Patent No.: US 8,181,990 B2
(45) Date of Patent: May 22, 2012

(54) MULTIPLE CHAMBER AIRBAG SYSTEM

(75) Inventor: Vivekananda Maripudi, Rochester Hills, MI (US)

(73) Assignee: TK Holdings Inc., Auburn Hills, MI (US)

(*) Notice: Subject to any disclaimer, the term of this patent is extended or adjusted under 35 U.S.C. 154(b) by 68 days.

(21) Appl. No.: 12/385,143

(22) Filed: Mar. 31, 2009

(65) Prior Publication Data

US 2010/0244419 A1    Sep. 30, 2010

(51) Int. Cl.
*B60R 21/18* (2006.01)
*B60R 21/205* (2011.01)
*B60R 21/233* (2006.01)

(52) U.S. Cl. .......... 280/743.2; 280/732; 280/742; 280/743.1

(58) Field of Classification Search .......... 280/729, 280/732, 742, 743.1, 743.2
See application file for complete search history.

(56) References Cited

U.S. PATENT DOCUMENTS

| | | | | |
|---|---|---|---|---|
| 5,358,273 A * | 10/1994 | Onishi et al. | ......... | 280/743.1 |
| 5,513,877 A * | 5/1996 | MacBrien et al. | ......... | 280/732 |
| 5,906,391 A | 5/1999 | Weir et al. | | |
| 5,945,184 A * | 8/1999 | Nagata et al. | ......... | 428/35.2 |
| 6,276,716 B1 * | 8/2001 | Kato | ......... | 280/735 |
| 6,364,348 B1 | 4/2002 | Jang et al. | | |
| 6,371,509 B1 * | 4/2002 | Ellerbrok et al. | ......... | 280/729 |
| 6,679,522 B2 * | 1/2004 | Igawa | ......... | 280/743.1 |
| 6,976,702 B2 * | 12/2005 | Yokota et al. | ......... | 280/730.2 |
| 7,000,947 B2 | 2/2006 | Kumagai et al. | | |
| 7,021,652 B2 | 4/2006 | Kumagai et al. | | |
| 7,059,634 B2 * | 6/2006 | Bossecker et al. | ......... | 280/739 |
| 7,455,317 B2 * | 11/2008 | Bito | ......... | 280/732 |
| 7,686,327 B2 * | 3/2010 | Heuschmid et al. | ......... | 280/729 |
| 7,695,012 B2 * | 4/2010 | Libby et al. | ......... | 280/743.1 |
| 7,722,080 B2 * | 5/2010 | Rose et al. | ......... | 280/743.2 |
| 7,748,738 B2 * | 7/2010 | Schneider | ......... | 280/740 |
| 2001/0007391 A1 * | 7/2001 | Hamada et al. | ......... | 280/743.2 |
| 2003/0160433 A1 * | 8/2003 | Kumagai et al. | ......... | 280/729 |
| 2004/0021304 A1 * | 2/2004 | Tanase et al. | ......... | 280/729 |
| 2006/0103120 A1 * | 5/2006 | Kurimoto et al. | ......... | 280/730.2 |
| 2007/0052221 A1 * | 3/2007 | Okada et al. | ......... | 280/735 |
| 2007/0216142 A1 * | 9/2007 | Honda et al. | ......... | 280/730.2 |
| 2008/0296875 A1 * | 12/2008 | Aho et al. | ......... | 280/729 |

(Continued)

FOREIGN PATENT DOCUMENTS

JP    9-30352 A   *  2/1997

(Continued)

OTHER PUBLICATIONS

Shibayama et al., Air Bag for Vehicle, May 20, 1997, JPO, JP 09-132097 A, English Abstract.*
Shibayama et al., Air Bag for Vehicle, May 20, 1997, JPO, JP 09-132097 A, Machine Translation of Description.*

(Continued)

*Primary Examiner* — Ruth Ilan
*Assistant Examiner* — James English
(74) *Attorney, Agent, or Firm* — Foley & Lardner LLP (57) ABSTRACT

An airbag for use within a motor vehicle, which includes a gas generator for supplying inflation gas; a lower chamber configured to be inflated directly by the gas generator; an upper chamber located above and proximate to the lower chamber; and a diffusing panel configured to separate the lower and upper chambers and allows inflation gas to pass through. The upper chamber is to be indirectly inflated by the gas generator through the diffusing panel, and upon completed deployment will have an internal pressure lower than the deployed internal pressure of the lower chamber.

20 Claims, 6 Drawing Sheets

U.S. PATENT DOCUMENTS

2009/0283991 A1 * 11/2009 Honda ........................ 280/729
2012/0025497 A1 * 2/2012 Yoo ............................. 280/729

FOREIGN PATENT DOCUMENTS

| JP | 09132097 A | * | 5/1997 |
| JP | 2007308122 A | * | 11/2007 |
| JP | 2008-1270 A | * | 1/2008 |

OTHER PUBLICATIONS

Masahiro Koike, Air Bag, Nov. 29, 2007, JPO, JP 2007-308122 A, English Abstract.*
Masahiro Koike, Air Bag, Nov. 29, 2007, JPO, JP 2007-308122 A, Machine Translation of Description.*

* cited by examiner

MULTIPLE CHAMBER AIRBAG SYSTEM

BACKGROUND

The present disclosure relates generally to the field of airbag use in motor vehicles. More specifically, this disclosure relates to a multiple chamber airbag having different pressures in each chamber to optimize restraint forces on the occupant to mitigate occupant injury.

Airbags are located in vehicles to protect occupants from injury during a vehicle dynamic impact event, which triggers sensors located in the vehicle to initiate deployment of an airbag(s). An airbag may deploy and inflate, by gas rapidly-entering its cushion(s) or chamber(s), typically through the use of an inflator containing an explosive charge (e.g., pyrotechnic device). Passenger airbags are typically stored within and deployed from the passenger dashboard compartment, and are typically packaged through a process of folding and rolling to compact the airbag in order to minimize its required packaging space. During a vehicle dynamic impact event, a passenger airbag deploys, typically from the upper portion (i.e., above the glove box) of the dashboard, in substantially rearward and upward directions to protect the head and torso of the occupant.

Figure 3:
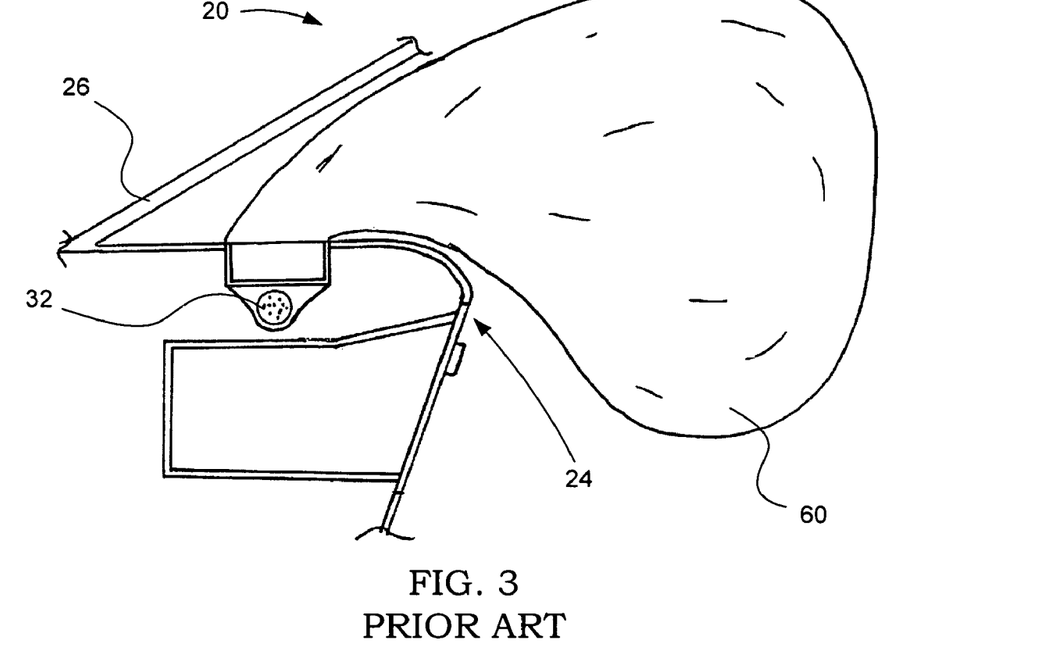
FIG. 3 is a cross-car section view of an interior passenger compartment, such as the passenger compartment of FIG. 2, illustrating a conventional embodiment of a single chamber airbag in the unfolded (deployed) state.
Figure 4:
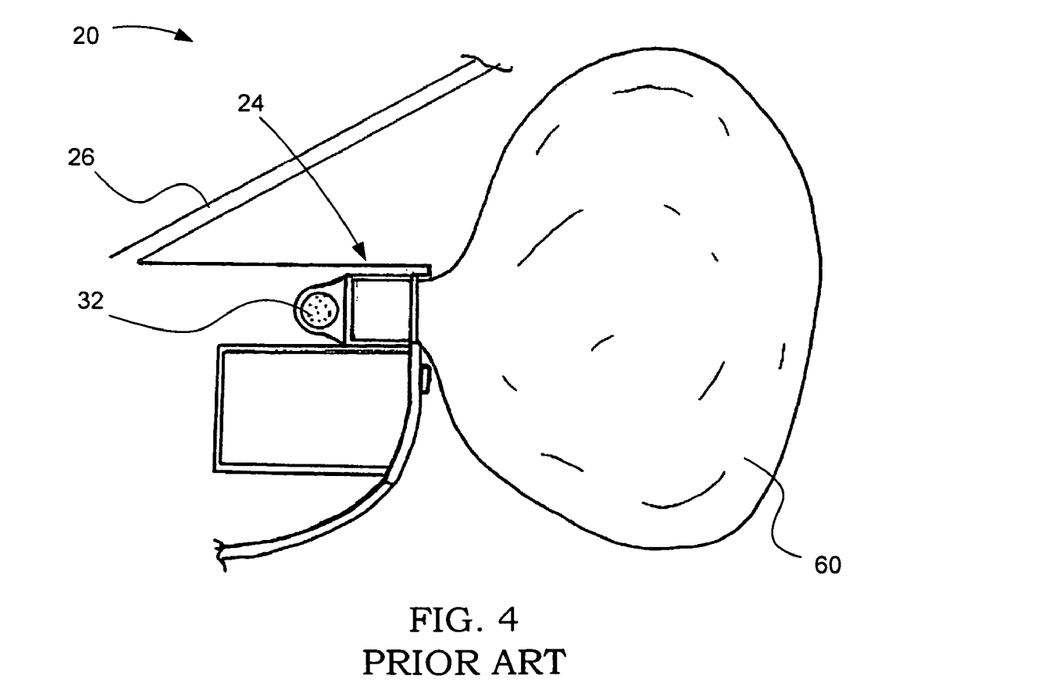
FIG. 4 is a cross-car section view of another embodiment of a single chamber airbag in the unfolded (deployed) state.

It has been known to construct a vehicle to include a passenger airbag 60 which may be mounted on the top facing surface of the dashboard, as shown in FIG. 3, or on the rear facing surface of the dashboard, as shown in FIG. 4. The airbag 60 may be constructed having a single chamber whereby the gas generated by the inflator is directly forced into the airbag chamber, unfolding and expanding the airbag chamber to provide protection to the vehicle occupant during a vehicle impact. It has also been known to construct a bi-lobular airbag, which includes a single chamber airbag having two adjacent lobes separated by a gap or void, whereby each lobe is directly inflated by the inflator. These methods of construction have several disadvantages, the key disadvantage being that during deployment of the airbag, each chamber or lobe will have substantially similar expansion forces, therefore exerting substantially uniform restraint forces onto all areas of contact with the occupant.

It would be advantageous for an airbag to be constructed to include of multiple chambers, whereby each chamber may exert a different predetermined restraint force onto the occupant, thereby mitigating occupant injury by optimizing restraint forces (i.e., having lower restraint forces on the lower mass head and neck regions, while having higher restraint forces on the higher mass chest or torso region). This configuration would provide optimized occupant protection and reduce head and neck injuries.

SUMMARY

One embodiment of this disclosure relates to an airbag for use within a motor vehicle, which includes a gas generator for supplying inflation gas; a lower chamber configured to be inflated directly by the gas generator; an upper chamber located above and proximate to the lower chamber; and a diffusing panel configured to separate the lower and upper chambers and allows inflation gas to pass through. The upper chamber is to be indirectly inflated by the gas generator through the diffusing panel, and upon completed deployment will have an internal pressure lower than the deployed internal pressure of the lower chamber. The airbag may further include a housing for storing the folded airbag and the gas generator, and at least one tether to provide stability during deployment of the airbag, which may be configured in a substantially vertical direction extending from the lower portion of the lower chamber to the lower portion of the upper chamber. The diffusing panel may includes a plurality of apertures or may be constructed of a porous material to allow gas flow to pass through.

Another embodiment of this disclosure relates to an inflatable safety device for use within a motor vehicle, which includes an airbag having a lower chamber coupled to an upper chamber by a diffusing panel; and a gas generator to provide inflation gas to the airbag. The lower chamber is configured to be inflated directly by the gas generator, and the upper chamber, having an internal pressure lower than the internal pressure of the lower chamber, is indirectly inflated by the gas generator through the diffusing means of the diffusing panel. The diffusing panel is configured to separate the lower and upper chambers, having a diffusing means to allow a predetermined gas flow to pass through. The diffusing means may include a plurality of apertures to allow gas flow to pass through, or the diffusing panel may be constructed of a porous material to allow gas flow to pass through. The inflatable safety device further includes a housing for storing the folded airbag and the gas generator, and at least one tether to provide stability during deployment of the airbag, which may be configured in a substantially vertical direction extending from the lower portion of the lower chamber to the lower portion of the upper chamber.

BRIEF DESCRIPTION

DETAILED DESCRIPTION

Referring generally to the FIGURES, disclosed are multiple chamber airbags for use within a motor vehicle, configured to provide improved occupant protection by optimizing the restraint forces that are exerted onto the occupant during deployment. A multiple chamber airbag, in accordance with the present disclosure, can offer improved occupant protection by having multiple chambers, each having a tailored chamber pressure (during deployment), to control the restraint forces exerted by each chamber onto its specific region of contact with the occupant. Additionally, the disclosed multiple chamber airbags may have a reduced mass and cost, resulting from the use of a lower mass (and cost) inflator, since the volume of direct inflation may be reduced.

According to an exemplary embodiment, a multiple chamber airbag system includes an upper chamber, a lower chamber, a center panel, and an inflator. The lower chamber may be directly inflated by the inflator, thereby having a higher chamber pressure, and may support the torso of the occupant during deployment. The upper chamber may support the head and neck of the occupant and may be indirectly inflated by the inflator, thereby having a lower internal chamber pressure relative to the internal chamber pressure of the lower chamber, during deployment. The center panel separates the upper and lower chambers and allows gas to pass from the lower chamber into the upper chamber.

According to another exemplary embodiment, a multiple chamber airbag system includes an upper chamber, a lower chamber, a center panel, an inflator, and at least one tether. The lower chamber may be directly inflated by the inflator, thereby having a higher chamber pressure, and may support the torso of the occupant during deployment. The upper chamber may support the head and neck of the occupant, and may be indirectly inflated by the inflator, thereby having a lower internal chamber pressure relative to the internal chamber pressure of the lower chamber, during deployment. The center panel separates the upper and lower chambers and allows gas to pass from the lower chamber into the upper chamber. The airbag may be constructed to include tethers to improve the deployment trajectory or shape, further improving occupant protection.

According to another exemplary embodiment, a multiple chamber airbag system includes an upper chamber, a lower chamber, a center panel to separate the upper and lower chambers, an inflator, and an airbag ring. The lower chamber and the upper chamber may be directly inflated by the inflator, through the airbag ring. The airbag ring controls the amount of gas that enters each chamber, thereby during deployment, the upper chamber may have a lower internal chamber pressure relative to the internal chamber pressure of the lower chamber.

According to another exemplary embodiment, a multiple chamber airbag system includes an upper chamber, a lower chamber, a center panel to separate the upper and lower chambers, an inflator, and a diffuser. The lower chamber and the upper chamber may be directly inflated by the inflator, through the diffuser. The diffuser controls the amount of gas that enters each chamber, thereby during deployment, the upper chamber may have a lower internal chamber pressure relative to the internal chamber pressure of the lower chamber.

Figure 1:
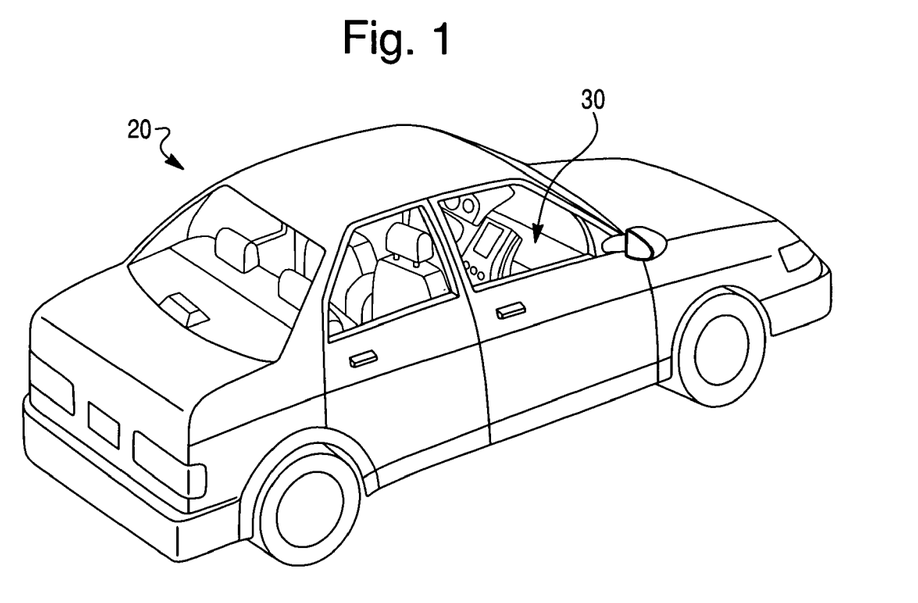
FIG. 1 is a perspective view of an exemplary embodiment of a motor vehicle.

Referring to FIG. 1, an exemplary embodiment of a motor vehicle 20 is illustrated to include a multiple chamber airbag assembly 30. The vehicle 20 is illustrated as a typical sedan, but the device of this disclosure may be used on any type of passenger vehicle as well as other moving vehicles that offer occupant protection to seated passengers in the form of frontal positioned airbags.

Figure 2:
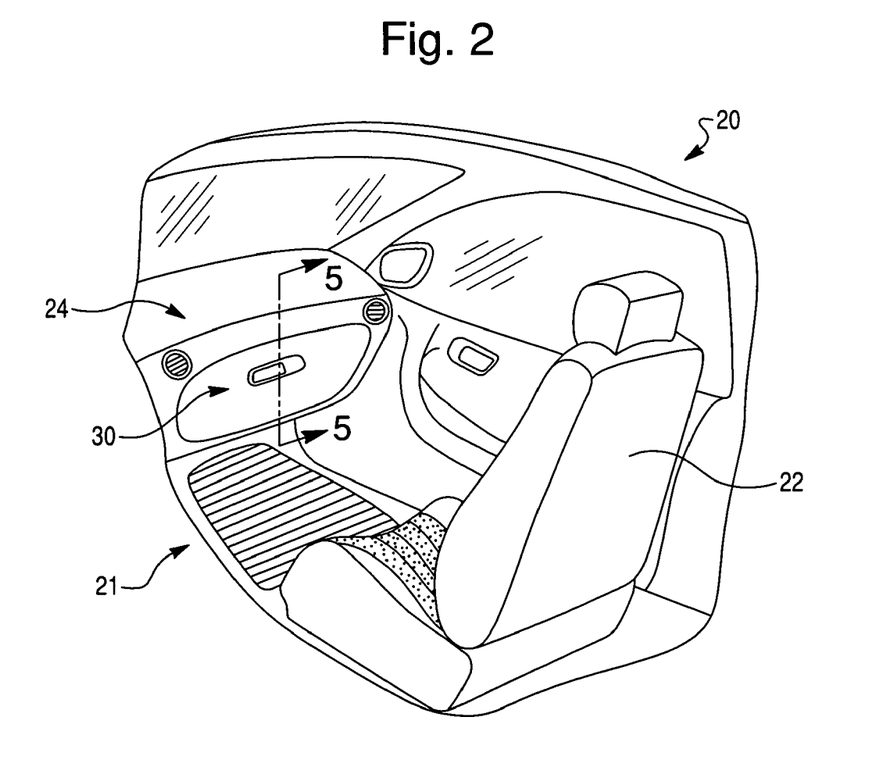
FIG. 2 is a perspective view of an exemplary embodiment of an interior passenger compartment of a motor vehicle, such as the motor vehicle of FIG. 1.

Referring to FIG. 2, the passenger compartment 21 of the vehicle 20 of FIG. 1, is illustrated, according to an exemplary embodiment, and includes a dashboard assembly 24, a multiple chamber airbag assembly 30, and a passenger seat assembly 22. According to another exemplary embodiment, the dashboard assembly 24 may include a multiple chamber airbag assembly 30 integrated within it, and may be configured to fit within the unique packaging requirements of vehicle 20. A multiple chamber airbag assembly 30 is flexibly configurable for use in varying package requirements, and may be tailored to satisfy specific needs of the vehicle manufacturer.

Figure 5:
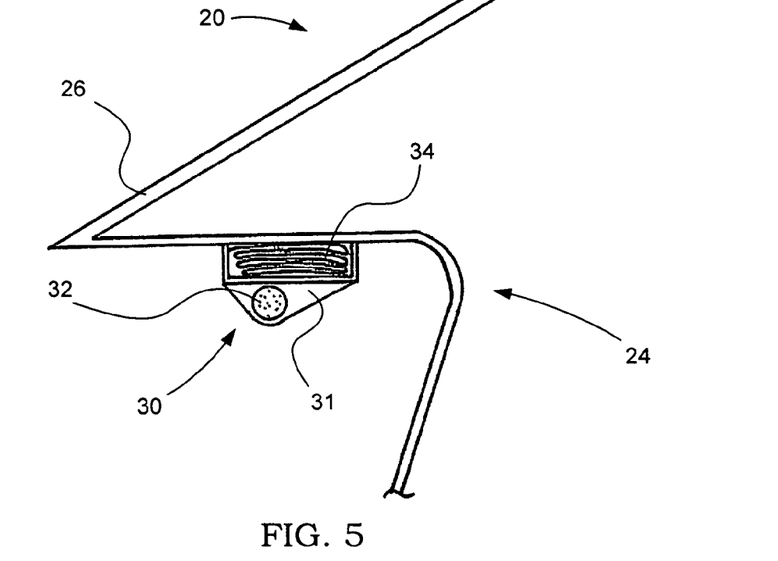
FIG. 5 is a cross-car section view of the interior passenger compartment of FIG. 2 according to an exemplary embodiment of a multiple chamber airbag shown in the folded (undeployed) state.
Figure 6:
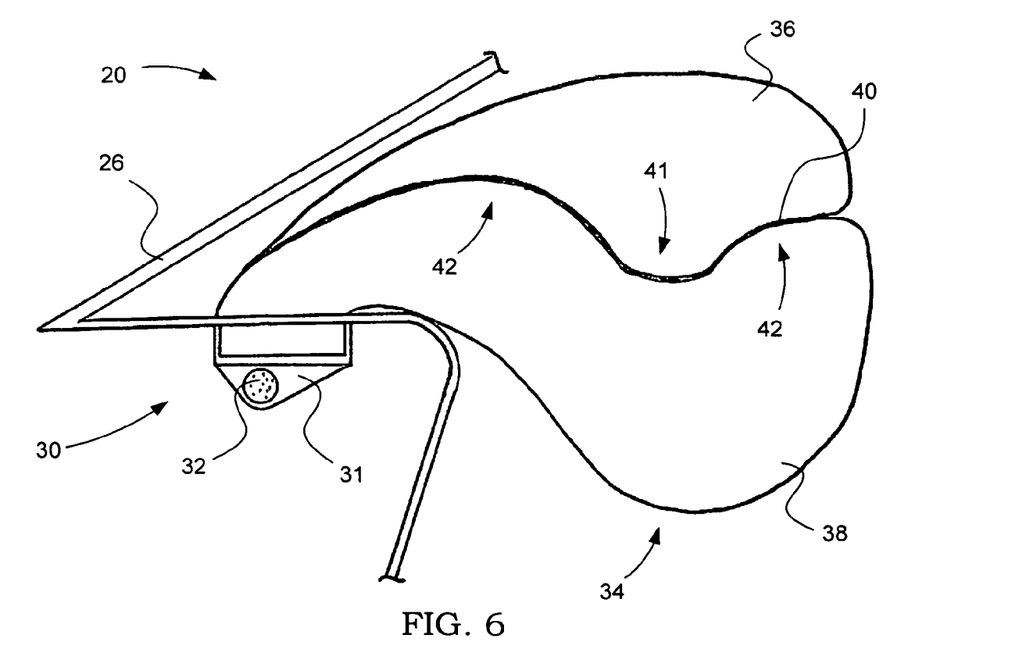
FIG. 6 is a cross-car section view of the interior passenger compartment of FIG. 2 according to an exemplary embodiment of a multiple chamber airbag shown in the unfolded (deployed) state.

Referring to FIG. 5, an exemplary embodiment of a multiple chamber airbag assembly 30 is illustrated in the folded or non-deployed state. A multiple chamber airbag assembly 30 includes an airbag 34 and a gas generator (or inflator) 32 to provide gas to unfold and expand the airbag 34, typically through the use of an explosive charge (e.g., pyrotechnic device). Airbag 34 may be packaged through a method of rolling and/or folding and stored within the dashboard assembly 24. According to an exemplary embodiment, a multiple chamber airbag assembly 30 may be stored such that, during deployment, the airbag will unfold initially in a substantially upward direction, then unfold in a substantially rearward direction towards the occupant, while expanding in the cross-car and up-down directions. This embodiment typically is constructed so, during deployment, the airbag 34 will breach the upper facing surface of the dashboard assembly 24, as shown in FIGS. 5 and 6. According to another exemplary embodiment, a multiple chamber airbag assembly 30 may be stored such that, during deployment, the airbag 34 will unfold in a substantially rearward direction towards the occupant, while expanding in the cross-car and up-down directions, similar to that shown in FIG. 4. This embodiment typically is constructed so, during deployment, the airbag 34 will breach the rear facing surface of the dashboard assembly 24 or through the door of the glove box assembly. A multiple chamber airbag assembly 30 may be packaged according to other embodiments and may deploy according to other methods and is not limited by these exemplary embodiments.

According to another embodiment, an exemplary embodiment of a multiple chamber airbag assembly 30 includes an airbag 34, a housing 31 and a gas generator 32. The housing 31 may be made of steel, aluminum, composite, or other useful material, and may provide structural support to the multiple chamber airbag assembly 30, store the folded airbag 34, and retain the gas generator 32. The housing 31 may provide for attachment of the multiple chamber airbag assembly 30 to the vehicle 20 or to any component of vehicle 20. The attachment may include extruded holes that accept conventional fasteners (e.g., bolts, rivets), or the attachment may be weld nuts, bolts, apertures, or other useful features to couple components.

Referring to FIG. 6, the exemplary embodiment of the multiple chamber airbag assembly 30 of FIG. 5 is illustrated in the unfolded or deployed state. According to an exemplary embodiment, an airbag 34 includes a lower chamber 38, an upper chamber 36, and a diffusing (or center) panel 40. The lower chamber 38 may be coupled to the housing 31 so that during deployment the gas generator 32 forces gas directly into the lower chamber 38 of the airbag 34, expanding the lower chamber 38 as it unfolds.

According to an exemplary embodiment, diffusing panel 40 may be made of fabric or other material or film, which may be coated or uncoated, and may include a plurality of apertures that permits the transfer of gas at a predetermined pressure. According to other exemplary embodiments, diffusing panels 40 may diffuse gas through the mesh structure of the fabric or material from which the diffusing panel 40 is constructed. A center panel 40 may be constructed to diffuse gas at a predetermined rate based on a predetermined pressure to optimize performance of the safety system. During deployment of airbag assembly 30, when the internal pressure of the lower chamber 38 reaches a predetermined pressure, gas begins to diffuse through the diffusing panel 40 into the upper chamber 36 of airbag 34, expanding and unfolding the upper chamber 36. Therefore the upper chamber 36, as shown in FIG. 6, may be indirectly inflated by the gas generator 32. This configuration has multiple chambers, with each chamber having a varying internal chamber pressure. According to the exemplary embodiment of FIG. 6, the upper chamber 36 may have a lower internal chamber pressure relative to the internal chamber pressure of the lower chamber 38, whereby the upper chamber 36 provides support to the head and neck regions of the occupant and the lower chamber 38 provides support to the torso region of the occupant. This configuration optimizes protection to the occupant by exerting less restraint force onto the lower mass head and neck of the occupant and exerting more restraint force onto the higher mass torso of the occupant. This optimized protection reduces the likelihood of an injury to the occupant, especially to the head and neck of the occupant.

According to other embodiments, multiple chamber airbag assemblies may be configured to include any number of directly or indirectly inflated with each indirectly inflated chamber separated from a directly inflated chamber by a diffusing panel. Each diffusing panel may be constructed to provide different transfer rates for the inflation gas, to control the expansion of that specific chamber and to further control the internal pressure of that specific chamber to provide a predetermined restraint force onto the occupant. Therefore a multiple chamber airbag assembly may be tailored to have a plurality of chambers, each having a predetermined internal pressure at deployment to provide optimized occupant protection during a vehicle impact event that triggers deployment. According to other exemplary embodiments, multiple chamber airbag assemblies may have more than one chamber being directly inflated by the gas generator and having at least one other chamber indirectly inflated through a diffusing panel.

A diffusing panel 40 may be constructed to form a geometry, upon deployment, that includes a combination of concave and convex portions 41, 42, with respect to the lower chamber 38. According to an exemplary embodiment, diffusing panel 40 of airbag assembly 30, when deployed, includes a first convex portion 42, a second convex portion 42, and a concave portion 41, which is positioned between the first and second convex portions 42 in the fore-aft direction of vehicle 20. This configuration of diffusing panel 40 provides improved stability of airbag assembly 30 during deployment, by having less bounce relative to multiple chamber airbags that include a substantially flat center panel. The configuration of diffusing panel 40 disclosed in this application produces less bounce by directing inflation gas (and hence forces generated by the inflation gas) from the lower chamber 38 into the upper chamber 36 along vectors that are substantially horizontal or diagonal in addition to substantially vertical, where a flat diffusing panel directs gas along only substantially vertical vectors. The substantially vertical forces generated by a flat diffusing panel create a greater tendency for the airbag to bounce, during deployment, due to the offset distance between the fixed portion of the airbag, which is coupled to the housing, and the diffusing location which varies along the length of the center panel. These vertical diffusing forces generate a series of moments from each offset distance that induces the airbag to bounce, typically between the dashboard and windshield of the vehicle. The airbag assembly 30 constructed with a diffusing panel 40 that includes a series of concave and convex portions 41, 42, directs more gas along substantially horizontal and diagonal vectors, reducing bounce. This configuration also has less volume that is directly injected between the windshield 26 and dashboard 24, which additionally reduces bounce.

According to other embodiments, airbag assemblies may be configured to include center panels, which include any combination of concave and convex portions and is not limited to the exemplary embodiment above. Additionally, center panels may further be configured to reduce vertical forces resulting from inflation of the upper chamber from the lower chamber through the center panel, by restricting gas flow through the substantially vertical facing portions and/or by increasing gas flow through the substantially horizontal facing portions.

Additionally, the multiple chamber airbag assembly also may be configured with a lower mass gas generator than traditionally configured airbags. Typically, one of the key parameters in designing the size of the gas generator required is the volume of the airbag that is to be directly inflated. The multiple chamber airbag assemblies disclosed may have a reduced volume being directly inflated, allowing for a smaller mass and cost gas generator to be used in constructing the multiple chamber airbag assemblies.

Figure 7:
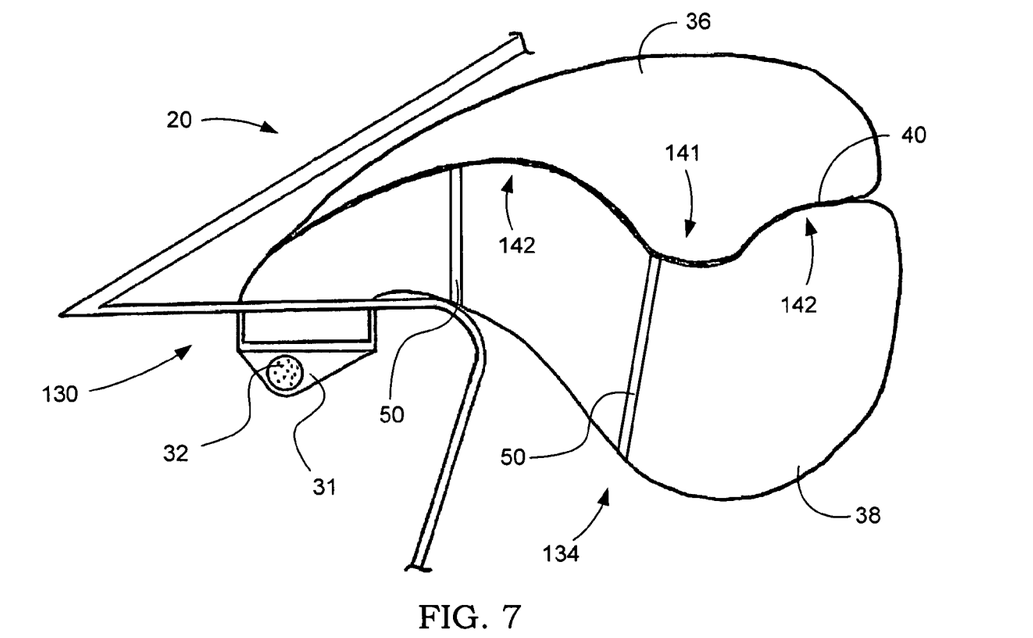
FIG. 7 is a cross-car section view of another exemplary embodiment of a multiple chamber airbag shown in the unfolded (deployed) state.

Referring to FIG. 7, another exemplary embodiment of a multiple chamber airbag assembly 130 is illustrated in the unfolded or deployed state, and includes a housing 31, an airbag 134, a gas generator 32, and at least one tether 50. Airbag 134 includes at least one chamber, such as lower chamber 38, which is directly inflated by the gas generator 32; at least one chamber, such as upper chamber 36, which is indirectly inflated by the gas generator 32; and at least one diffusing panel 40, which separates an indirectly inflated chamber from a directly inflated chamber. Diffusing panel 40, when deployed, forms two convex portions 142 with a concave portion 141 between them. The tethers 50, as shown in FIG. 7, extend in a substantially vertical direction. According to other embodiments, tethers 50 may be configured to extend in a substantially horizontal direction, a substantially diagonal direction, or any other useful direction. The tethers 50 provide support to the airbag 134 during deployment to tailor the trajectory or shape of the airbag 134, to further improve occupant protection to further reduce occupant injury during a dynamic vehicle impact event.

Figure 8:
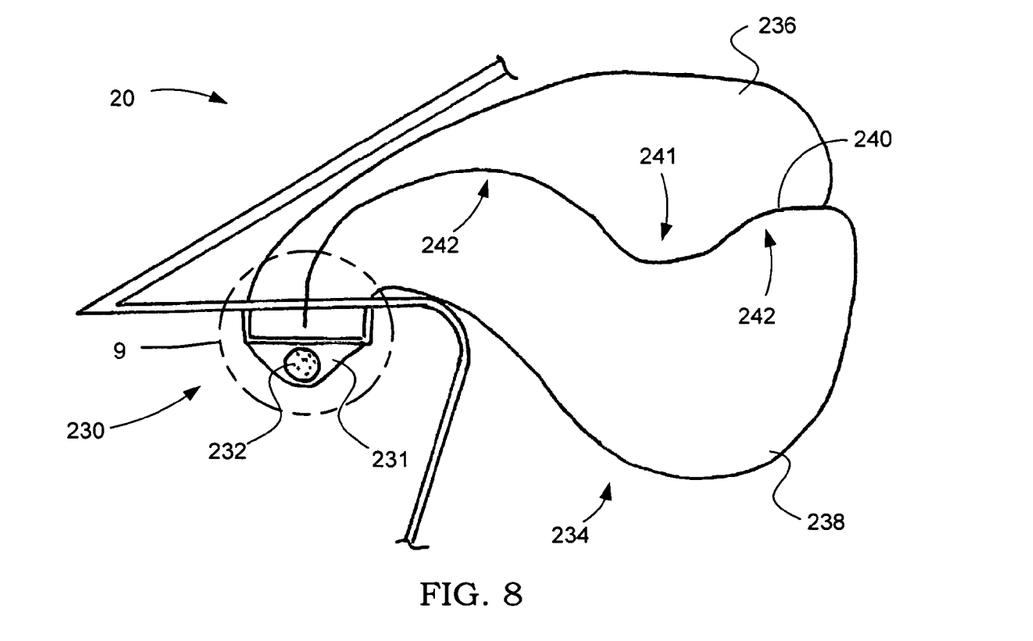
FIG. 8 is a cross-car section view of another exemplary embodiment of a multiple chamber airbag shown in the unfolded (deployed) state.
Figure 9:
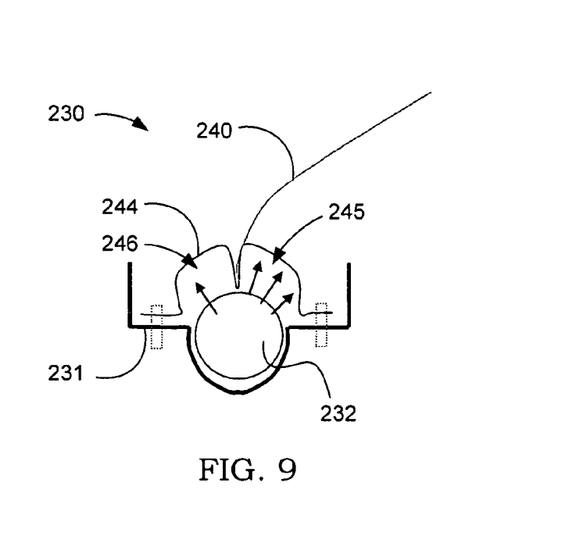
FIG. 9 is a detail view of an exemplary embodiment of a gas routing for use within a multiple chamber airbag, such as the multiple chamber airbag of FIG. 8.

Referring to FIGS. 8 and 9, another exemplary embodiment of a multiple chamber airbag assembly 230 is illustrated in the unfolded or deployed state, and includes a housing 231, an inflator 232, an airbag 234, and an airbag ring 244. Airbag 234 includes a lower chamber 238 and an upper chamber 236, which are separated by a center panel 240. Center panel 240, when deployed, forms two convex portions 242 with a concave portion 241 between the two convex portions 242. Center panel 240 may be coupled to the airbag ring 244 to tailor the amount of gas injected into each chamber.

Airbag ring 244 may be made of steel or other material that may withstand the high temperatures and pressures generated by the creation and dispersion of the inflation gas. Airbag ring 244 includes a first cavity 245 and a second cavity 246 separated by a wall or divider, which may be coupled to the center panel 240. The first cavity 245 of airbag ring 244 serves as the inlet for inflation gas that directly inflates the lower chamber 238 of airbag 234, and the second cavity 246 of airbag ring 244 serves as the inlet for inflation gas that directly inflates the upper chamber 236 of airbag 234. The first and second cavities 245, 246 of airbag ring 244 may include apertures to allow inflation gas to flow through. According to an exemplary embodiment, the apertures of the first cavity 245 allow more inflation gas to pass through than the apertures of the second cavity 246 to create a higher internal chamber pressure within the lower chamber 238 than within the upper chamber 236. The pressures of the different airbag chambers 236, 238 may be tailored by the specific configurations of the apertures of the airbag ring cavities 245, 246. For example, the airbag ring first cavity 245 may have larger or more apertures, when compared to the apertures of the airbag ring second cavity 246, thereby allowing more volume of inflation gas to pass through per second.

Figure 10:
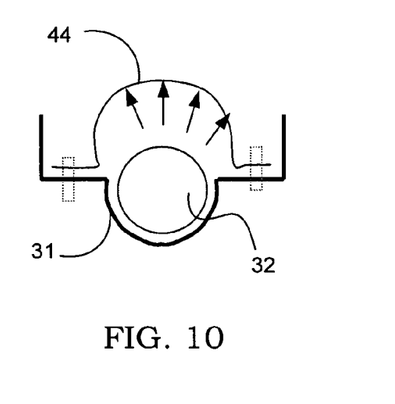
FIG. 10 is a detail view of another exemplary embodiment of a gas routing for use within a multiple chamber airbag.

Referring to FIG. 10, an exemplary embodiment of an airbag ring 44 is illustrated coupled to an airbag housing 31, which together encompass the inflator 32. This configuration may be used in construction of a multiple chamber airbag assembly, such as the multiple chamber airbag assembly 30, as shown in FIG. 6. Airbag ring 44 includes a single cavity, which includes apertures that allow inflation gas to pass through, upon deployment of the airbag assembly 30.

Figure 11:
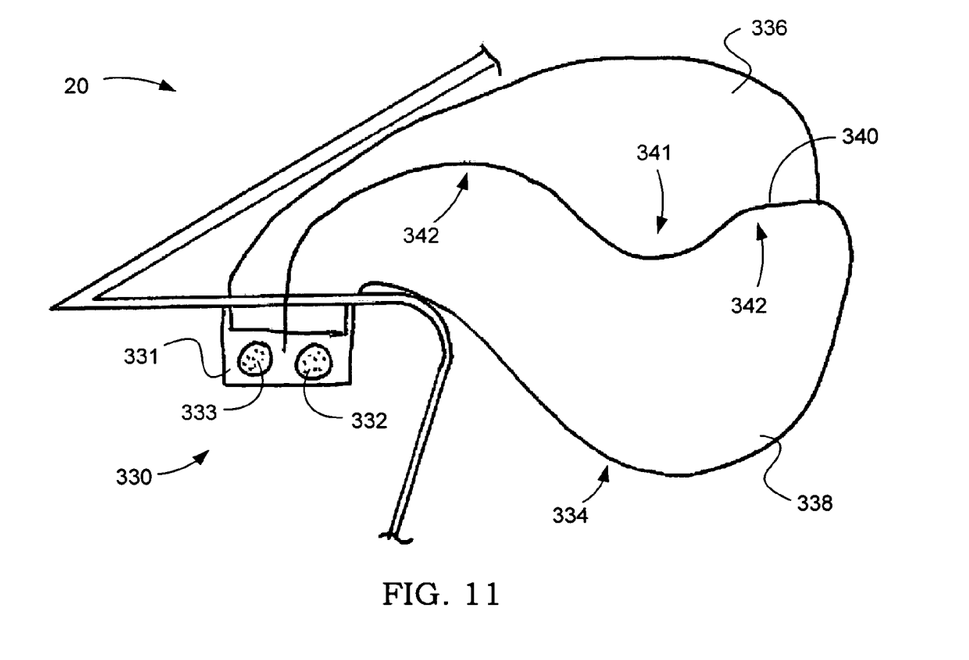
FIG. 11 is a cross-car section view of another exemplary embodiment of a multiple chamber airbag shown in the unfolded (deployed) state.

Referring to FIG. 11, another exemplary embodiment of a multiple chamber airbag assembly 330 is illustrated and includes a housing 331, first and second inflators 332, 333 that are coupled to the housing 331, and an airbag 334. Airbag 334 includes a lower chamber 338, an upper chamber 336, and a center panel 340, which separates the lower and upper chambers 338, 336. A first inflator 332, upon actuation, deploys inflation gas which may directly inflate the lower chamber 338 of airbag 334. A second inflator 333, upon actuation, deploys inflation gas which may directly inflate the upper chamber 336 of airbag 334. Upon deployment of airbag 334, center panel 340 forms a combination of convex and concave portions 342, 341 with respect to the lower chamber 338. First inflator 332 may be configured to be more powerful (i.e., produce more inflation gas inducing higher inflation pressure) that the second inflator 333, thereby upon deployment, lower chamber 338 may have a higher internal chamber pressure relative to the upper chamber 336.

Figure 12:
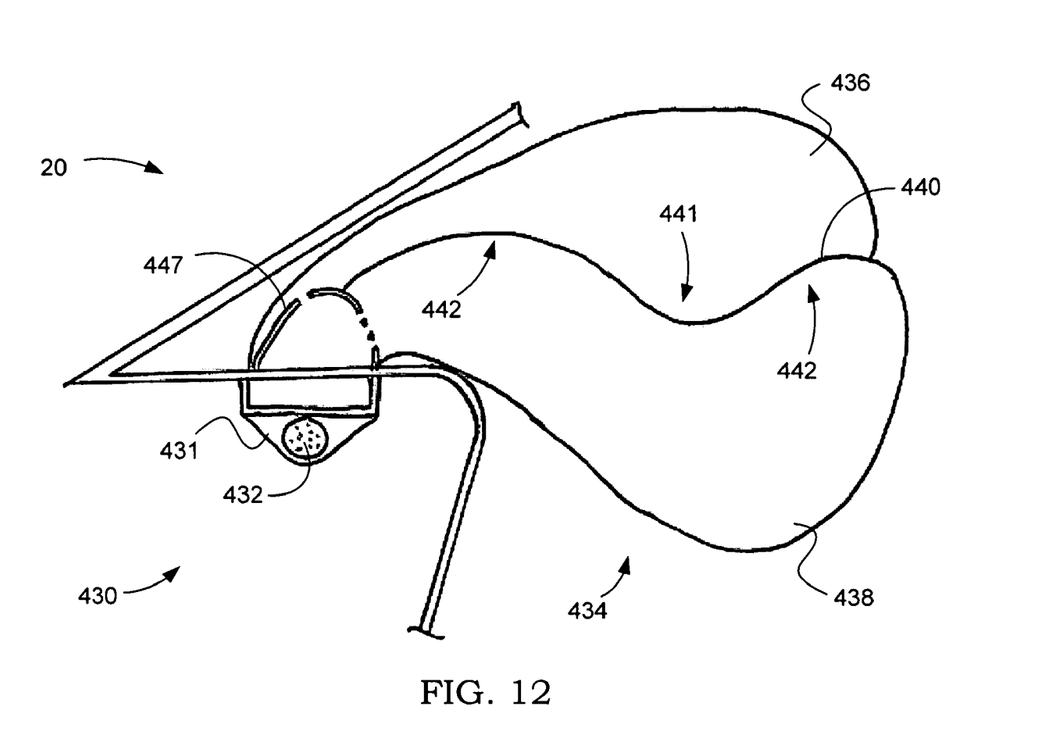
FIG. 12 is a cross-car section view of another exemplary embodiment of a multiple chamber airbag shown in the unfolded (deployed) state.

Referring to FIG. 12, another exemplary embodiment of a multiple chamber airbag assembly 430 is illustrated and includes a housing 431, an inflator 432, an airbag 434, and a diffuser 447. Airbag 434 includes a lower chamber 438, an upper chamber 436, and a center panel 440, which separates the lower and upper chambers 438, 436. Center panel 440 may be coupled to diffuser 447, and upon deployment of airbag 434, center panel 440 forms a combination of convex and concave portions 442, 441 with respect to the lower chamber 438. Diffuser 447 may be coupled to airbag 434, and upon actuation of inflator 432 may direct more inflation gas into the lower chamber 438 than the upper chamber 436, thereby inducing a higher internal pressure within lower chamber 438 relative to upper chamber 436.

According to an exemplary embodiment, diffuser 447 may be made of a cloth or fabric which allows inflation gas to pass through it. According to other embodiments, diffuser 447 may be made from a polymer, composite material, or other useful material. Diffuser 447 may be coated or uncoated, and may contain apertures, voids or other useful features to allow gas to pass through it.

Figure 13:
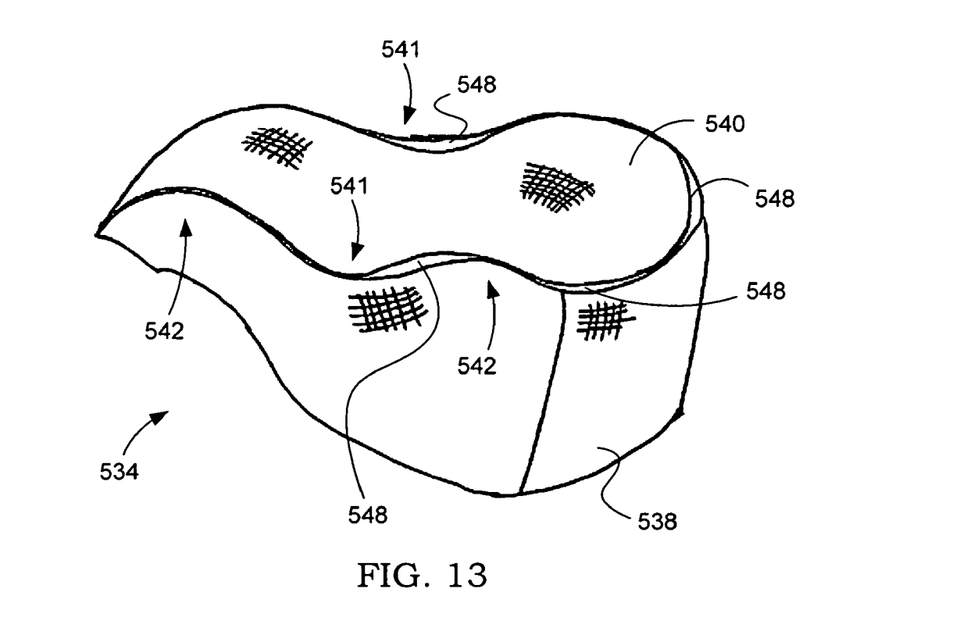
FIG. 13 is a perspective view of another exemplary embodiment of a multiple chamber airbag shown in the unfolded (deployed) state.

Referring to FIG. 13, a portion of another exemplary embodiment of an airbag 534 is illustrated and includes a lower chamber 538, an upper chamber 536 (not shown for clarity), and a center panel 540, which separates the upper and lower chambers 536, 538. The center panel 540 is coupled to both the upper and lower chambers 536, 538 through stitching, and upon deployment forms two convex portions 542 separated by a concave portion 541. The lower chamber 538 includes an opening at one end to allow inflation gas to enter the chamber and unfold it during deployment. According to an exemplary embodiment, the stitching which couples the center panel 540 to the chambers includes gaps (or voids) 548, which allow inflation gas to pass by the center panel 540 from the lower chamber 538 into the upper chamber 536. The quantity and size (e.g., length and width) of voids 548 drive the amount of inflation gas that passes from the lower chamber 538 into the upper chamber 536, and may be varied or tailored to specific applications. It should be noted that this configuration could be combined with other configurations, for example, a configuration with a center panel including apertures to further influence the transfer of inflation gas from the lower chamber to the upper chamber.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the multiple chamber airbag system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag for use within a motor vehicle, comprising:
   a gas generator for supplying inflation gas;
   a lower chamber configured to be inflated directly by the gas generator;
   an upper chamber located above and proximate to the lower chamber; and
   a diffusing panel configured to separate the lower and upper chambers and to allow inflation gas to pass between the chambers;
   wherein the upper chamber is to be indirectly inflated by the gas generator supplying gas directly to the lower chamber and then to the upper chamber via the diffusing panel, and upon completed deployment will have an internal pressure lower than the deployed internal pressure of the lower chamber,
   wherein the diffusing panel, upon deployment of the airbag, includes at least two convex portions and at least one concave portion relative to the lower chamber to stabilize deployment, and
   wherein each convex portion successively alternates with one of the at least one concave portions along an entire length of the diffusing panel,
   wherein one end of the diffusing panel is fixed proximate to the gas generator and the other end of the diffusing panel is connected to a portion of the airbag remote from the gas generator and expected to contact an occupant.

2. The airbag of claim 1, further comprising a housing for storing the folded airbag and the gas generator.

3. The airbag of claim 1, further comprising at least one tether to provide stability during deployment of the airbag.

4. The airbag of claim 3, wherein at least one tether may be configured in a substantially vertical direction extending from a lower portion of the lower chamber to a lower portion of the upper chamber.

5. The airbag of claim 1, wherein the diffusing panel includes a plurality of apertures to allow gas flow to pass through.

6. The airbag of claim 1, wherein the diffusing panel is constructed of a porous material to allow gas flow to pass through.

7. The airbag of claim 1, wherein the lower chamber is coupled to the gas generator.

8. An inflatable safety device for use within a motor vehicle, comprising:
   an airbag including a lower chamber coupled to an upper chamber by a center panel; and
   a gas generator to provide inflation gas to the airbag;
   wherein the lower chamber is configured to be inflated directly by the gas generator,
   wherein the upper chamber, having an internal pressure lower than the internal pressure of the lower chamber when the airbag is inflated, is indirectly inflated by the gas generator,
   wherein the center panel is configured to allow a predetermined gas flow to pass into the upper chamber, the center panel being configured to separate the lower and upper chambers, and
   wherein the center panel, upon deployment, includes at least two convex portions and at least one concave portion relative to the lower chamber to stabilize deployment, and
   wherein each convex portion successively alternates with one of the at least one concave portions along an entire length of the center panel,
   wherein one end of the center panel is fixed proximate to the gas generator and the other end of the center panel is connected to the airbag at a portion of the airbag remote from the gas generator and expected to contact an occupant.

9. The inflatable safety device of claim 8, further comprising a housing for storing the folded airbag and the gas generator.

10. The inflatable safety device of claim 8, further comprising at least one tether to provide stability during deployment of the airbag.

11. The inflatable safety device of claim 10, wherein at least one tether may be configured in a substantially vertical direction extending from a lower portion of the lower chamber to a lower portion of the upper chamber.

12. The inflatable safety device of claim 8, wherein the center panel includes a plurality of apertures to allow gas flow to pass through.

13. The inflatable safety device of claim 8, wherein the center panel is constructed of a porous material to allow gas flow to pass through.

14. The inflatable safety device of claim 8, wherein the lower chamber is coupled to the gas generator.

15. The inflatable safety device of claim 8, further comprising an airbag ring connected to the center panel, wherein the airbag ring is configured to direct gas flow into the upper chamber and the lower chamber so that the lower chamber has an internal pressure higher than an internal pressure of the upper chamber.

16. The inflatable safety device of claim 15, wherein the airbag ring includes a divider coupled to the center panel.

17. An inflatable safety device for use within a motor vehicle, comprising:
   an airbag with a lower chamber, an upper chamber, and a center panel, wherein the lower chamber is separated from the upper chamber by the center panel; and
   a gas generator to provide inflation gas to the airbag,
   wherein the upper chamber has an internal pressure different from an internal pressure of the lower chamber, and
   wherein the center panel, upon deployment, includes at least two convex portions and at least one concave portion relative to the lower chamber to stabilize deployment, and
   wherein each convex portion successively alternates with one of the at least one concave portions along an entire length of the center panel,
   wherein one end of the center panel is fixed proximate to the gas generator and the other end of the center panel is connected to a portion of the airbag remote from the gas generator and expected to contact an occupant.

18. The inflatable safety device of claim 17, further comprising an airbag ring, wherein the center panel is coupled to the airbag ring and is configured to direct flow of inflation gas to control the amount of inflation gas directly inflating the lower chamber and the upper chamber.

19. The inflatable safety device of claim 17, further comprising a second gas generator, wherein the gas generator is configured to directly inflate the lower chamber and the second gas generator is configured to directly inflate the upper chamber.

20. The inflatable safety device of claim 17, further comprising a diffuser coupled to the center panel, and wherein the diffuser and center panel are configured to direct more inflation gas into one of the lower chamber and the upper chamber than the other of the lower chamber and the upper chamber.

* * * * *